(12) United States Patent
Decaluwe et al.

(10) Patent No.: US 9,060,495 B2
(45) Date of Patent: Jun. 23, 2015

(54) STORAGE UNIT FOR AT LEAST ONE DEVICE FOR IDENTIFYING ANIMALS AND/OR COLLECTING ANIMAL TISSUE

(75) Inventors: Johan Decaluwe, Laval (FR); Emmanuel Lemaire, Mont d'Origny (FR)

(73) Assignee: Allflex Europe, Vitre (FR)

( * ) Notice: Subject to any disclaimer, the term of this patent is extended or adjusted under 35 U.S.C. 154(b) by 487 days.

(21) Appl. No.: 13/100,178

(22) Filed: May 3, 2011

(65) Prior Publication Data

US 2011/0269228 A1 Nov. 3, 2011

(30) Foreign Application Priority Data

May 3, 2010 (FR) ..................................... 10 53433

(51) Int. Cl.
| | | |
|---|---|---|
| *A61B 10/00* | (2006.01) | |
| *B01L 3/00* | (2006.01) | |
| *A61J 1/06* | (2006.01) | |
| *B01L 9/00* | (2006.01) | |
| *G01N 21/75* | (2006.01) | |
| *A01K 11/00* | (2006.01) | |

(52) U.S. Cl.
CPC .............. *A01K 11/00* (2013.01); *A01K 11/001* (2013.01)

(58) Field of Classification Search
CPC ... A01K 11/003; A01K 11/00; A01K 11/001; A01K 11/004; A01K 11/006; A61B 10/0266; A61B 10/0096; A61B 10/02; A61B 17/32053; B29C 70/68

USPC .......................... 422/401, 536, 547, 554, 560
See application file for complete search history.

(56) References Cited

U.S. PATENT DOCUMENTS

| | | | |
|---|---|---|---|
| 4,685,472 A * | 8/1987 | Muto .............................. | 600/573 |
| 4,721,064 A * | 1/1988 | Denk et al. ..................... | 119/655 |
| 4,958,452 A * | 9/1990 | Tate ................................ | 40/301 |
| 5,016,369 A | 5/1991 | Parry | |
| 5,449,071 A | 9/1995 | Levy | |
| 6,524,316 B1 * | 2/2003 | Nicholson et al. ............. | 606/326 |
| 6,708,432 B2 * | 3/2004 | Haar et al. ...................... | 40/301 |
| 2003/0000119 A1 * | 1/2003 | Savy ............................... | 40/301 |
| 2005/0273117 A1 * | 12/2005 | Teychene ....................... | 606/116 |
| 2010/0286556 A1 * | 11/2010 | Decaluwe et al. ............. | 600/567 |
| 2010/0325926 A1 * | 12/2010 | Hilpert et al. .................. | 40/301 |
| 2011/0295148 A1 * | 12/2011 | Destoumieux et al. ....... | 600/564 |
| 2013/0211416 A1 * | 8/2013 | Teychene et al. ............. | 606/117 |

FOREIGN PATENT DOCUMENTS

| | | |
|---|---|---|
| FR | 2929804 | 10/2009 |
| FR | 2940009 | 6/2010 |
| WO | WO 2009049706 A1 * | 4/2009 |
| WO | 2009/1275542 | 10/2009 |

* cited by examiner

*Primary Examiner* — Dean Kwak
(74) *Attorney, Agent, or Firm* — David D. Brush; Westman, Champlin & Koehler, P.A.

(57) ABSTRACT

A storage unit is disclosed for at least one animal identification and/or animal tissue collecting device, capable of storing said at least one identification and/or collecting device. In several embodiments, such a set includes at least one container containing a specific agent designed to be applied at least partially to at least one element of said identification and/or collecting device.

19 Claims, 4 Drawing Sheets

STORAGE UNIT FOR AT LEAST ONE DEVICE FOR IDENTIFYING ANIMALS AND/OR COLLECTING ANIMAL TISSUE

RELATED APPLICATION

This application claims priority under 35 U.S.C. §119 to French patent application Ser. No. 10/53433 filed May 3, 2010, entitled "Storage Unit for at Least One Device for Identifying Animals and/or Collecting Animal. Tissue, and Corresponding Method for Identifying or Collecting Tissue" the disclosure of which is incorporated herein by reference in its entirety.

1. FIELD OF THE INVENTION

The field of the invention is that of the control and/or identification of animals, with a view especially to placing an identification device (also called a tag) and/or collecting animal tissue.

More specifically, the invention pertains to the conditioning or packaging of an identification and/or tissue-collecting device such as this.

2. PRIOR ART

There are well known ways of identifying animals (especially farm animals) by means of a tag applied for example to an animal's ear or wing. This tagging pertains to cattle as well as to sheep, pigs, goats, poultry, fish or any other animal species. Indeed, livestock identification has been made compulsory in many countries, especially in order to ensure that this livestock can be traced and to guarantee the provenance of animals intended especially for consumption.

Classically, a tag includes an identification number recorded on a label through which an animal can be traced throughout its existence. For example, according to the European Directive 1760/2000, all cattle must be identified by an ear tag placed on each ear. The tags placed on both ears of a bovine animal, each bearing a same identification code enabling this animal to be uniquely identified, form a pair.

These tags are applied by piercing the animal tissue so as to irreversibly fix a male part into a female part for example by means of a ring, notches or and/or a fastening clip.

An example of such a tag including a male part and a female part is illustrated in FIG. 1. The male part 10 includes a rod 14 extending from a support 12 substantially perpendicular to this support 12 and designed to rest on a face of the animal's ear.

The rod 14 is terminated by a conical or truncated tip 16 (also called a head) demarcating an external shoulder 15 used to keep the tip 16 in a reception cavity 13 of the female part 11.

The tip 16 is generally used to perforate the animal tissue before being fitted into or clipped into the female part 11, so that the male part 10 is irreversibly associated with the female part 11.

There is also a known way of collecting a sample of animal tissue when applying a tag or else independently of the application of the tag.

For example, when this collecting is done while applying a tag, the tip can be truncated and enable the passage of a collecting unit, for example a biopsy needle type. In one variant, a cutting element of punch type can be provided at the end of the truncated tip.

Similarly, when this collecting is done independently of the application of the tag, a punch-type cutting element can be fixed to a collecting tool such as a clamp for example.

In every case, the element that goes through the animal's skin (tip, biopsy needle, punch etc) must be clean, especially to prevent infection at the wound created by this "perforating" element. Indeed, the hole made (in the ear for example) is a site of infection where microorganisms can grow and penetrate the animal's organism.

The element passing through the animal's skin must therefore be disinfected before use in order to facilitate the cicatrization of the wound and reduce risks of infection.

At present, there are two solutions available to the user (breeders, farmers etc) to disinfect this perforating element:
the use of a can containing a disinfecting liquid or gel into which the perforating element is dipped;
the use of a spray.

These forms of packaging of disinfectant in the form of cans or sprays unfortunately have many drawbacks. For example, a large-sized container makes it difficult to transport the disinfectant. Furthermore, a container of this kind will not necessarily be within reach of the user during the tagging and/or removal of tissue. Furthermore, the depth and/or shape of the container do not always enable the perforator element to be completely "dipped" before use.

Referring more specifically to can-type containers, it can be noted that one and the same container may be used to disinfect several perforator elements and could stay open for several days or several weeks etc, thus raising the problem of conservation and cleanliness of the product once the can has been opened.

If the can is large-sized then a part of its content may be poured into a smaller container to simplify its use, for example into a bottle cap or a plastic mug, again raising problems of cleanliness and purity of the new container and of the residues that may be present in this new container. Furthermore, once used, the product contained in the small container is thrown away causing a loss of product and therefore extra cost for the user. This approach also has drawbacks in terms of sustainable development since it requires a recycling of the small containers used.

The packaging of disinfectant in the form of spray also has drawbacks. Indeed, it generally gives rise to waste of product and problems of soiling for the breeder since the zone covered by the spray is imprecise.

Consequently, existing forms of packaging have many disadvantages and are impractical for use, and hence a large number of breeders do not perform this disinfecting operation prior to tagging animals and/or collecting animal tissue.

There is therefore a need for a new packaging of such products that is particularly simple to use.

3. SUMMARY OF THE INVENTION

The invention proposes a novel solution which does not have all these drawbacks of the prior art, in the form of a storage unit for at least one at least one animal identification and/or animal tissue collecting device capable of storing said at least one identification and/or collecting device.

According to the invention, a storage unit of this kind has at least one container containing at least one specific agent designed to be applied at least partially to an element of said identification and/or collecting device, the container being formed by or inserted into a cavity of said storage unit.

A storage unit of this kind also has blocking means preventing an irreversible joining of a male part and a female part of said identification and/or collecting device.

The term "identification device" or "tag" is understood to mean a set formed by several elements, including at least one male part and one female part, as illustrated in FIG. 1. A collecting device is a set formed by several elements including at least one cutting element (for example a punch, a biopsy needle etc) and a storage element (for example a collecting tube).

The invention thus proposes a novel set for packaging one or more animal identification and/or animal tissue collecting devices enabling the user to always have, within reach, a container containing a specific agent such as a disinfectant when applying a tag or collecting a sample of animal tissue.

Indeed, the storage unit according to the invention is used to store one or more animal identification and/or animal tissue collecting devices, kept for example in this storage unit by holding means, as well as one or more containers containing a specific agent. When applying a tag or collecting a tissue sample, the user can then "unfasten" an identification and/or collecting device from the storage unit, apply the specific agent contained in the container of the storage unit to at least one portion of an element of the device (such as the tip of a male part, a biopsy needle, a punch etc.) and then use said device, i.e., apply the tag or remove a sample of tissue.

Breeders are thus encouraged to treat the element that perforates the animal's tissues of the animal, by being provided with an "all-in-one" set since the storage unit of the identification and/or collecting devices include at least one container containing a specific agent such as an antiseptic substance.

The invention thus offers the user the advantage of not having to use an additional container for the disinfectants, especially by providing facility of use. Indeed, the user no longer has to carry a bulky container or transfer a product from one recipient to another.

Furthermore, it is possible simultaneously to transport the identification and/or collecting device or devices and the tank or tanks (container(s)) containing the quantity of specific agent needed to use these devices. Thus, the waste of specific agent is avoided by adapting the quantity of specific agent (provided for in one or more containers) to the number of devices.

It can be noted that the specific agent contained in the container is not necessarily a disinfectant but may be a cicatrizing agent, a preserving agent, a desiccant, a medicine, a vaccine, a combination of at least two of the above agents etc.

If the agent is a disinfectant or cicatrizing agent, it enables the destruction at least partly of the microorganisms (bacteria, viruses etc) that could provoke a virus infection in the tissues perforated during the application of the tag and/or the collection, or could contaminate the collected sample.

If the agent is a preserving agent or desiccant, it improves the preservation of a sample of tissue to be collected and if necessary prepares it for subsequent treatment such as DNA analysis.

If the agent is a medicine or a vaccine, it enables the animal to be treated if necessary, as this agent can be passed into the blood at the position of the perforated tissues or absorbed into the animal's skin.

In other words, the specific agent of the invention can take the form of any product that can act on the animal or upon a sample of tissue collected from the animal.

In particular, such a specific agent may have different forms such as a gel, cream, fat, liquid, powder, gas, impregnated foam etc contained in a tank or container.

Several containers containing distinct specific agents may also be provided in the storage unit, enabling for example initially the disinfection of the element designed to perforate the tissues and then secondly the application of a preserving agent to the element if such an element is intended for the collection of a tissue sample.

According to a first embodiment, the container is detachable.

The storage unit can then have a housing or cavity to receive the container.

Thus, the methods for making and/or assembling two storage units designed to contain different specific agents can be identical up to the stage of addition of the container or containers.

Furthermore, in the case of agents having a short conservation time, the containers can be added just before the delivery of the storage units or just after their use.

The user may for example receive firstly storage units comprising identification and/or collecting devices without containers and secondly, as needed, batches of containers to be inserted into the storage units. It can also replace the containers containing unused and possibly out-of-date agents.

Besides, it is possible for the user to withdraw the container from the storage unit before applying the specific agent to the identification and/or collecting device.

For example, the removable container can be positioned directly on a tag-applying and/or sample-collecting tool such as a clamp before the application of the tag or collection of tissue.

The container is then perforated when applying the tag or collecting tissue and can release the specific agent that it contains directly on to the animal's wound or into a tube for receiving the collected tissues.

In a second embodiment, the container is formed by a cavity of said storage unit.

For example, the storage unit is made by molding a plastic such as polyethylene, polystyrene or the like, and at least one cavity capable of containing the specific agent is provided.

At least one portion of an element of an identification and/or collecting device such as the tip of a male part, a biopsy needle, a punch or the like may directly "dip" into the specific agent or be in direct contact with this agent through the direct storage of this element in the cavity of the storage unit.

This approach ensures the proper application of the specific agent to the element and optimizes its effects through prolonged contact.

According to one variant, the user positions the element on a tag-applying and/or sample-collecting tool such as a clamp and perforates the storage unit at the container-forming cavity before the tag is applied or the tissue collected. The container is then perforated and can release a specific agent that it contains directly on the element of the identification and/or collecting device.

Again, the invention ensures accurately localized application of the specific agent to the element.

In particular, whatever the embodiment envisaged, the container can be closed by closing means capable of being detached and perforated.

These closing means belong to the group comprising a lid (heat-soldered, bonded or the like), a plug, a portion of said element or any other means.

For example, if we consider a male part type element for which the tip and possibly a part of the rod "dip into" or are in direct contact with the specific agent, the closing means can be formed by the support of the male part.

The detachable closing means enable a subsequent re-utilization of the product contained in the container through the closure of the container after each use.

In certain embodiments of the invention, the container has a shape adapted so that the element can be at least partially in contact with the specific agent.

In this way, an appropriate "coating" is obtained of the element or portion of the element that perforates the animal's tissues, thus optimizing the action of the specific agent.

Furthermore, this adapted shape minimizes the quantity of product needed.

In particular, the container has an inlet diameter with a size greater than or equal to the diameter of the base of a tip of a male part of the identification and/or collecting device.

In this way, the shape of the container "matches" the shape of the tip of the male part and the entire tip can be impregnated with specific agent before the application of a tag and/or the collection of tissues.

Furthermore, the storage unit of the invention comprises blocking means preventing an irreversible assembly of a male part and a female part of the identification and/or collecting device.

For example, these blocking means take the shape of at least a pin that abuts a tissue collection or tag application tool.

These blocking means can also be formed by the bottom of the container, which has a thickness sufficient to prevent the irreversible joining of the male and female parts.

According to one particular characteristic of the invention, the storage unit includes one container per identification and/or collecting device.

This characteristic offers advantages in terms of hygiene since the container is a single-use container and the specific agent is not re-utilized thus ensuring the purity and preservation of the product. Furthermore, the quantity of agent planned per container can be very small thus preventing or at least reducing losses of product.

According to one variant, the storage unit has one container per pair where one pair has at least two identification and/or collecting devices having a same identification code (for example two tags to be applied to each ear of an animal, or an identification device and a collecting device intended for the same animal, etc).

A same container can therefore be used to perform two distinct operations on a same animal and each container may contain the quantity of product adapted to a pair.

Since the re-utilization of the product is immediate, the invention offers the advantage of being detached from the issues and problems of preservation of the specific agent.

According to another variant, a single container is provided for the entire storage.

For example, such a storage unit has ten identification devices in the form of two rows, the male parts forming a first row and the female parts associated with these male parts forming a second row.

Thus, the quantity of product per storage unit is optimized.

According to another aspect of the invention, the storage unit comprises dividable portions enabling the separation of at least one container and/or identification and/or collecting device.

A storage unit of this kind thus makes it possible to remove the container before use to facilitate its handling when it is perforated.

It also enables the withdrawal of the locations of the already used containers/devices, especially the used containers, in order to avoid fouling unused containers/devices and reducing the space requirement of the storage unit.

In another embodiment, the invention pertains to a method of animal identification or collection of animal tissue to identify an animal by means of an animal identification device and/or to collect an animal tissue by means of an animal tissue collecting device, including a step for setting up at least one element of the identification and/or collection device on a applying tool of an identification and/or collection device.

According to the invention, such a method also includes the following steps:
application, to at least one portion of said element, of a specific agent contained in a container belonging to a storage unit as described here above;
identification of the animal and/or collection of animal tissue by means of said element.

It is thus easy for the user (breeder) to apply the specific agent before the identification (tagging) or tissue-collecting operations since he has available a single packaging storing the identification and/or collecting device or devices as well as the container or containers of specific agent.

In particular, the application step comprises a step for the perforation of the container by the element, the step being implemented by the exertion of a first pressure on said tool, and the identification and/or collection step is implemented by the exertion of a second pressure, greater than the first pressure, on the tool.

The term "greater pressure" is understood to mean a pressure resulting in a greater travel of said element.

Thus, the first pressure makes it possible solely to perforate the container and release the specific agent without irreversibly assembling the male and female parts of an identification and/or collecting device. It is the second pressure, which is greater than the first pressure, that enables the irreversible assembling of the male and female parts.

Thus, the application of the agent can be done once the male part is positioned on the tool. It is therefore possible to carry out the necessary handling operations on the male part, especially its installation on the tool, before applying the agent.

This prevents contamination of the male part or a dispersal of the specific agent after its application.

Furthermore, during the perforation of the container, the specific agent that it contains may be laid both on the male part and on the female part.

4. LIST OF FIGURES

Other features and advantages of the invention shall appear more clearly from the following description of a particular embodiment given by way of an illustrative and non-exhaustive example and from the appended drawings, of which:

FIG. 1 described with reference to the prior art illustrates a known ear tag including a male part and a female part;

5. DESCRIPTION OF ONE EMBODIMENT OF THE INVENTION

5.1 General Principle

Turning now to the drawings, an "all-in-one" storage unit for the tagging of an animal and/or the collection of animal tissue in accordance with embodiments of the invention is illustrated. Such a unit includes at least one animal identification device (tag) and/or animal tissue collecting device and at least one container for applying a specific agent (at least partially) to at least one element (male part, female part, perforator element etc) of such a device.

Thus, in the case of the tagging of an animal for example, the breeder has available, in the same storage unit, a male part, the female part associated with it and a container containing a quantity of product adapted to applying this tag. In this example, the case jointly conveys identifiers and at least one specific agent, thanks to the "all-in-one" packaging, without any risk of neglect and without any additional constraint for the user.

5.2 Presentation of a Storage Unit

Here below, referring to FIGS. 2A and 2B, a description is given of a particular embodiment of a storage unit according to the invention adapted to the storage of a pair (FIG. 2A) or several pairs (FIG. 2B) each including two identification devices carrying the same identification code (for example two tags to be applied to each ear of an animal).

Classically, each identification device has a male part (211, 221) and a female part (212, 222) secured to the storage unit (20A, 20B) by holding means. For example, the storage unit is made out of a thermo-shaped plastic including two cavities for holding the rods of the male parts 211 and 221 and two rod-shaped supports making it possible to receive the female parts 212 and 222 of a pair. Although, in other embodiments any of a variety of structures can be utilized to fix the parts of the identification device to the storage unit.

Figure 1:
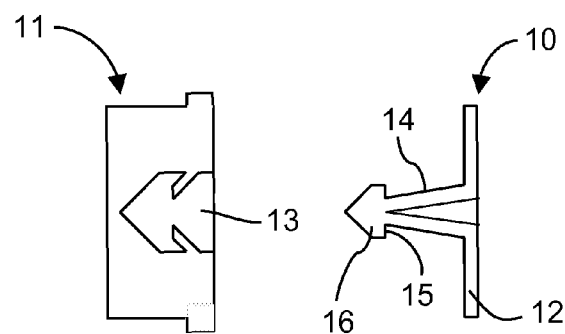
Figure 2B:
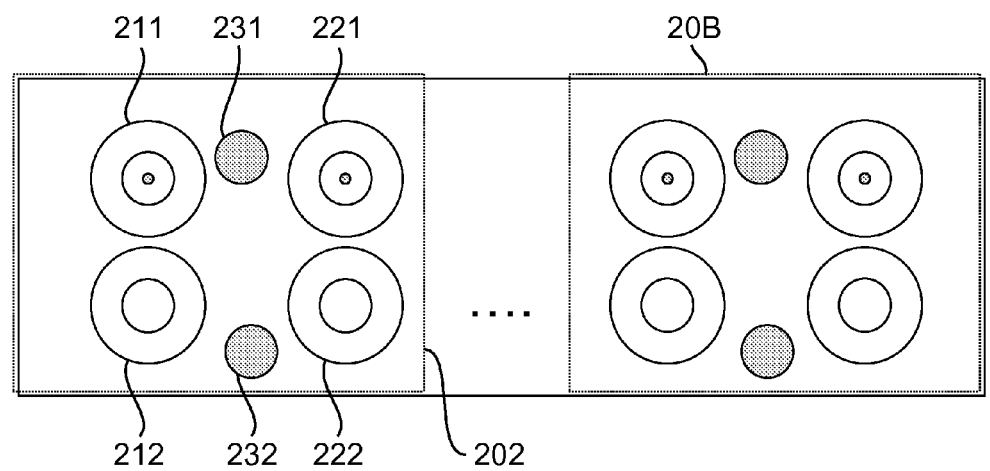
FIGS. 2A and 2B illustrate storage units according to one embodiment of the invention.
Figure 2A:
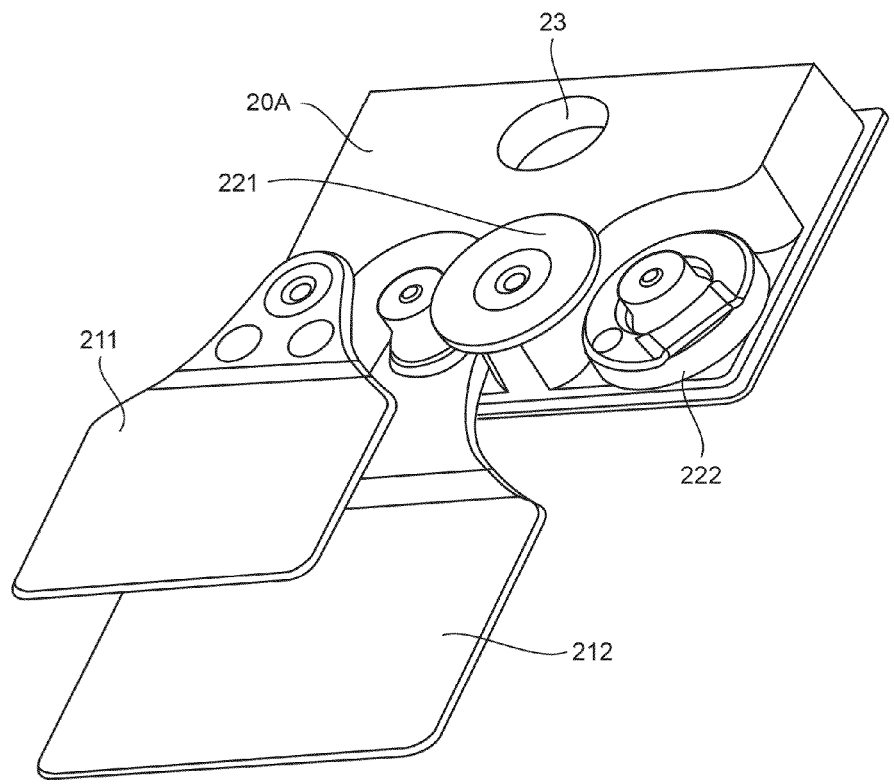

More specifically, FIG. 2A illustrates a storage unit 20A for storing a single pair and FIG. 2B illustrates a storage unit 20B taking the form of a packaging or conditioning strip by which it is possible for example to store five pairs.

As illustrated in FIG. 2A, in addition to these classic holding means, the storage unit 20A includes a container 23 capable of containing a specific agent, such as a disinfectant and/or a cicatrizing agent. In this example therefore one container 23 is provided for a pair.

It is also possible for example to provide for two containers 231 and 232 for a same pair (giving one container per tag) as illustrated in FIG. 2B.

According to one variant that is not shown, it is also possible to provide for a single container for the entire strip.

In particular, the quantity of specific agent contained in the containers varies according to the number of tags and containers of the storage unit. Thus, if one container per tag is provided, the quantity of agent provided for a container may be very small (in a range of a few millimeters for an agent in liquid form for example). Conversely, if it is planned to have one container for the entire strip, the quantity of agent provided for the container may be greater (about 100 centiliters for example). The size of the container may also vary.

It can be noted that the different containers 231, 232 of a same storage unit 20B may contain a same specific agent or different agents. These agents can therefore be usable successively (for example a disinfectant and then a preserving agent) or when needed by the user (for example a disinfectant and a preservative agent if the user removes a sample of animal tissue together with or independently of the application of a tag).

In one particular embodiment of the invention, the strip may take the form of dividable portions 202 enabling the pairs and/or the tags and/or the containers to be separated, which would enable a separation of a portion of the strip as and when it is needed by the user.

It can be noted that any other shape of storage unit can also be envisaged (rows, blocks, circles etc).

Once the pair or pairs have been secured to the strip and the container or containers contain at least one specific agent, the strip can be wrapped and sent to the users in a flexible packet made of plastic for example.

Figure 3:
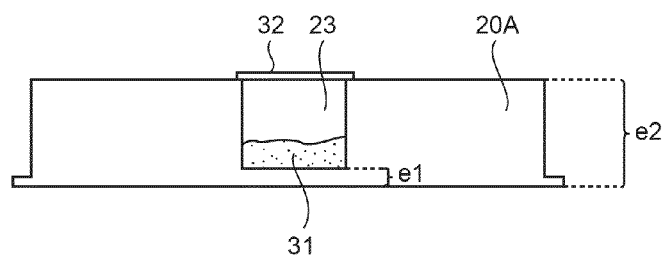
FIG. 3 illustrates an example of a container of a storage unit according to FIG. 2A.

FIG. 3 presents a view in section of the container 23 of FIG. 2A.

Such a container has for example a cylindrical shape and contains a specific agent 31.

Such an agent is for example a disinfectant or antiseptic or a cicatrizing agent such as oxygenated water. Thus, the invention reduces the risks of contamination of the wound formed in the animal's tissues and enables improved cicatrization.

It may also be a preserving product especially for use with a collecting device which makes it possible either to take a tissue sample without applying any a tag (this is a "tissue-sampling unit") or to take a sample of tissue in applying a tag (this is a "tissue-sampling tag"). Thus, the preserving agent can for example be a desiccant based on silica and/or clay in particular.

The specific agent may also be a medicine, a vaccine or any other agent acting on a tissue concerned by the applying of a tag or the collecting of a sample, or any other combination of one of these agents.

The specific agent may be especially presented in the form of a gel, a fat, a cream, a gas or a liquid. In one alternative, the container 23 contains foam (of the polyurethane or polyethylene type for example) impregnated with such an agent.

As already indicated, the shape of the container 23 is adapted to receiving the element of the identification and/or tissue-collecting device designed to perforate the animal's tissues.

In the embodiment shown in FIG. 3, the container 23 has a substantially circular aperture for the passage of the tip of the male part 211 or 221 closed by a lid 32 which enables the specific agent to be preserved. This lid 32 may be withdrawn from the container 23 before use of the specific agent or eke pierced by the tip of the male part or any other perforating element of an identification and/or collecting device.

In accordance with the invention, a container 23 of this kind thus enables the coating of the tip (and possibly a portion of the rod) of the male part 211, 221 by the specific agent 31.

In particular, the diameter of the container 23 is herein substantially equal to the diameter of the base of the tip of the male part so as to contain only the quantity of agent needed for action on the tip.

Figure 4:
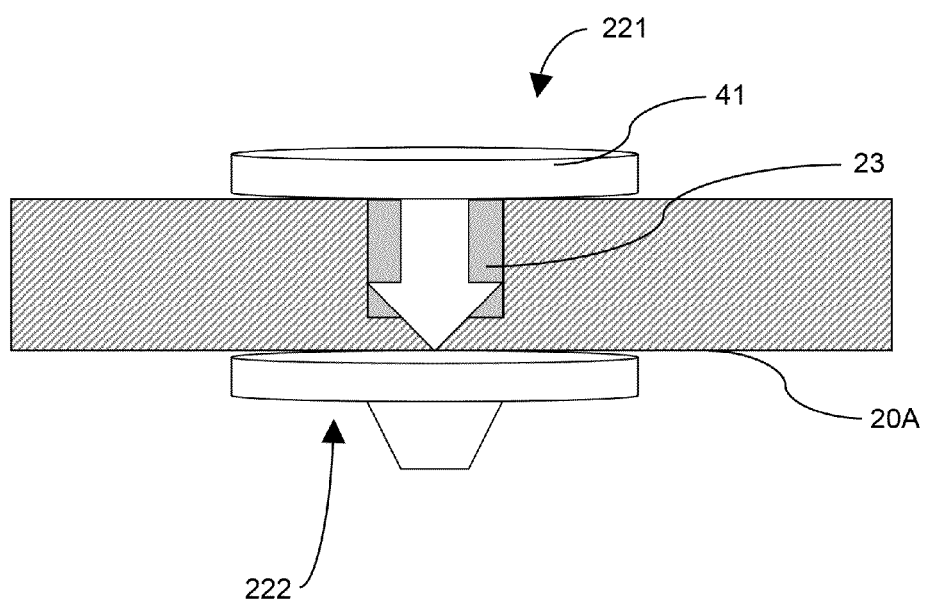
FIG. 4 illustrates the position of a perforating element in the container of FIG. 3.

FIG. 4 provides a more precise illustration of the position of the tip of the male part 221 in the container 23.

In this example of an embodiment, the aperture of the container 23 has a diameter slightly greater than that of the base of the tip or of a truncated portion of the tip (corresponding to the widest part of the tip) so as to limit the quantity of specific agent needed to coat the tip.

Advantageously, the bottom of the container 23 can be perforated by the tip of the male part 221 or any other perforating element to enable contact between the specific agent and the female part 222 and/or a sample-collecting tube.

In such an embodiment, it is necessary to ensure that it remains possible to withdraw the perforated element from the container and from the female part 222 and/or from the sample-collecting since the tag has not yet been applied or the sample has not yet been collected.

Thus, in certain embodiments of the invention adapted especially to use for the tagging of an animal, the shape of the container must be adapted to preventing the male part of the device from penetrating the female part of a tag during the perforation of the container and thus causing these two parts to get locked together.

Different blocking means can be implemented to this end, especially an appropriate thickness of the bottom of the container (for example a thickness e1 of the order of 3 millimeters for a thickness of the entire storage unit e2 of the order of 15 millimeters). These thicknesses may vary according to the type of tag, the length of the rods, the hardness of the storage unit etc. Although, in a number of embodiments any of a variety of blocking structures can be utilized.

The male part can also have a support 41 resting on the edges of the container 23 as illustrated in FIG. 4, limiting the introduction of the rod into the container while at the same time enabling the bottom of the container to be perforated.

These blocking means can also take the form of a pin abutting a tissue-collecting or a tag-applying tool or a protrusion or a notch in the container which ensures a respective positioning of the male and female parts along different transversal axes.

The shape of a container is clearly not limited to the shape shown in the figures. Thus, a container may have an oblong shape.

Furthermore, the container can be formed by a cavity of the storage unit as illustrated in FIGS. 2A, 2B, 3 and 4, or it may be detachable and provided with a housing for receiving the storage unit.

Furthermore, although the figures illustrate the application of the invention to the storage and use of an animal identification device, the same characteristics and advantages can apply for a device for collecting animal tissue.

Furthermore, a storage unit according to the invention can also provide for locations to store other elements such as a lid of a sample-collecting tube etc.

5.3 Fabrication of Storage Units

Another advantage of the invention lies in the method of fabricating and packaging such storage units, which is easy to implement.

It is indeed possible to provide for a first classic production line to produce identification and/or sample-collecting devices (male parts, female parts or any other element to be inserted into the storage units), a second production line to generate the storage units according to the invention (including possibly a pre-formed container), a possible third production line to produce the containers containing the specific agent if they are detachable and an assembly line to insert the identification and/or collecting devices thus fabricated, and as the case may be the containers, on the storage units. What remains to be done then is to insert the storage units into an envelope for example before sending them to the users.

5.4 Example of Implementation of the Animal Identification or Animal Tissue Collecting Method According to an Embodiment Here below, we describe the use of a storage unit according to the invention, for example by a breeder.

As described here above, storage unit of this kind includes at least one identification and/or collecting device, and at least one container containing a specific agent.

According to the invention, during a first step, at least one identification device and/or collecting device is placed on an applying tool of an identification and/or collecting device.

Then, in a second step, a specific agent contained in the container of the storage unit is applied to a portion of the element (preferably the portion of the element designed to come into contact with the animal's tissues).

During a third step, the identification and/or animal tissue collecting operation is performed, using the element to which the specific agent has been applied.

Figure 5:
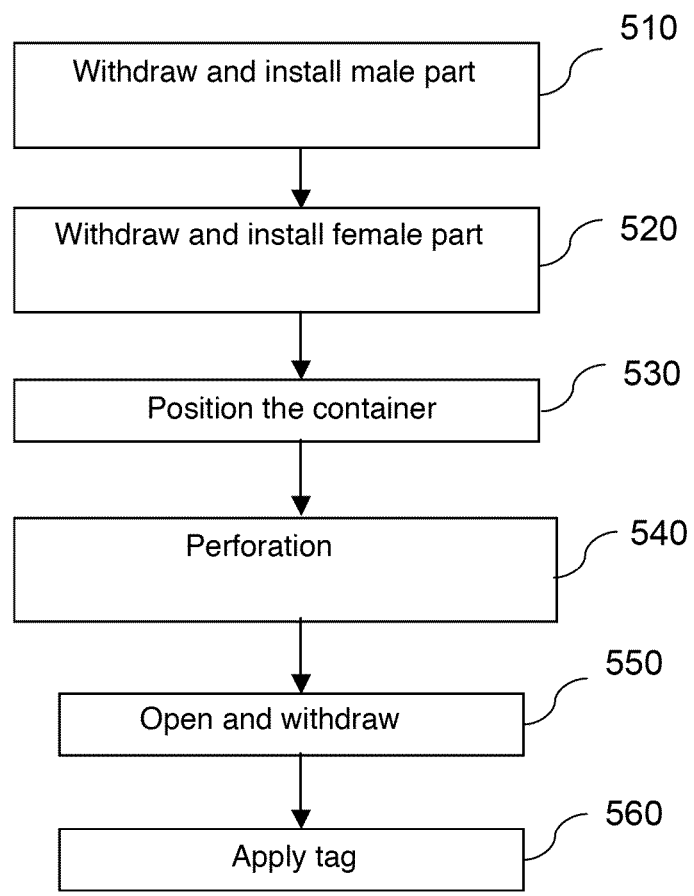
FIG. 5 illustrates the steps of the method for applying an identification and/or tissue collecting device according to one embodiment of the invention.

Referring now to FIG. 5, we present a particular mode of implementation of the method according to the invention when applying, to an animal, a tag available in the storage unit as illustrated in FIG. 2A for example.

FIG. 5 illustrates the dynamic working of the invention.

The method includes withdrawing 510 the male part 221 from the storage unit 20A and installing this male part on a first jaw of an applying tool, for example a clamp, and withdrawing 520 the female part 222 from the storage unit 20B and installing this female part on the second jaw of the clamp.

It can be noted that the steps 510 and 520 can be carried out in two stages (withdrawal and then installation of the male or female part on the clamp) or by a single action of the breeder, where the male and female parts are assembled for example by clipping with the clamp.

In other embodiments of the invention, it is possible to fix a punch-type cutting element on the first jaw of the clamp and a receiving tube on a second jaw of the clamp.

As shown in FIG. 5, the method then includes a step 530 for positioning the container 23 between two jaws of the clamp and then a step 540 for perforating the container by activating the clamp for a first time. The user thus exerts a first pressure on the clamp to perforate the container without irreversibly fitting together the male part 221 and female part 222. The result of this perforation step 540 is illustrated in FIG. 4. This perforation step 540 enables the tip and the rod of the male part 221 to be impregnated with the specific agent. Depending on the thickness of the bottom of the container, this perforation step 540 also enables the bottom of the container to be perforated and the cavity of the female part 222 to be at least partially impregnated.

Thus, the step 540 for perforating the container enables for example the coating of the male part 221 with a liquid agent present in the container 23 while at the same time prompting a flow of the agent on the female part of the tag.

If a punch-type cutting element is fixed to the first jaw of the clamp and if a receiving tube is fixed to the second jaw of the clamp, the perforation step 540 at least partially impregnates the cutting element with the specific agent and possibly at least partially impregnates a receiving tube (for example by allowing the specific agent to flow within the receiving tube).

During the following step (550), the breeder can open the clamp to remove the container and then place (560) the tag on the animal by positioning the animal's ear for example between the two jaws of the clamp and then activating the clamp a second time. The user therefore exerts a second pressure on the clamp, which is greater than the first pressure, locking the male and female parts on either side of the animal's ear.

The invention claimed is:

1. A package for at least one animal identification and/or animal tissue collecting device configured to store said at least one identification and/or collecting device, wherein said package comprises:

a male part of an identification and/or collecting device, which comprises a rod and a tip;

a female part of the identification and/or collecting device, which comprises a cavity configured to receive the tip of the male part such that when the tip is inserted fully into the cavity of the female part, the male part becomes irreversibly joined to the female part in a locking position;

at least one container formed by or inserted into a cavity of said package and containing a specific agent to be applied at least partially to at least one element of said identification and/or collecting device;

at least one holding cavity, which holds the male part of the identification and/or collecting device, the male part being removable from the at least one holding cavity; and at least one support, which holds the female part of the identification and/or collecting device, the female part being removable from the at least one support;

wherein the container comprises:
an aperture configured to receive the tip of the male part when the male part is removed from the holding cavity and placed on a first side of the container; and
blocking means configured to prevent said male part from penetrating said female part enough to cause said male and said female parts to engage in the locking position during an introduction of the tip of the male part in said container when the female part is removed from the support and held against a second, opposite surface of the container, where the locking position irreversibly joins the male part and the female part; and wherein the male part is configured to engage in the locking position with the female part in when the blocking means is removed from between the male and female parts.

2. The package of claim 1, wherein said container is detachable.

3. The package of claim 1, wherein said container aperture is closed by closing means configured to be removed or perforated.

4. The package of claim 3, wherein said closing means comprise a member of the group consisting of:
a lid;
a plug;
a portion of said element.

5. The package of claim 1 wherein said container has a shape adapted so that said element can be at least partially in contact with said specific agent.

6. The package of claim 5, wherein said container has an inlet diameter with a size greater than or equal to the diameter of the base of the tip of the male part of the identification and/or collection device.

7. The package of claim 1, wherein:
said blocking means take the shape of at least a pin; and
the pin is configured to abut a tissue collection tool or a tag application tool.

8. The package of claim 1, wherein said package comprises one container per identification and/or collecting device.

9. The package of claim 1, wherein said package comprises dividable portions enabling the separation of at least one container and/or identification device and/or collecting device.

10. The package of claim 1, wherein said specific agent comprises a member of the group consisting of:
a disinfectant;
a cicatrizing agent;
a preserving agent;
a desiccant;
a medicine:
a vaccine; and
a combination of at least two of the above agents.

11. The package of claim 1, wherein said specific agent takes one of the forms belonging to the group consisting of:
a gel,
a cream,
a fat,
a liquid,
a powder,
a gas, and
an impregnated foam.

12. The package of claim 1, wherein said blocking means are formed by a protrusion in said container.

13. The package of claim 1, wherein said blocking means are formed by a notch in said container.

14. The package of claim 1, wherein said blocking means are formed by the bottom of said container, which has a thickness sufficient to prevent the irreversible joining of said male and female parts during the introduction of the male part in said container.

15. The package of claim 1, wherein:
the container has a thickness between the first and second surfaces;
the thickness of the container between the first and second surfaces and the thickness of the bottom of said container are sized relative to a length of the male part such that when the male part is placed on the first surface with the tip fully inserted into the aperture of the container, and the female part is placed on the second, opposite surface:
the tip perforates the bottom of the container;
the tip is blocked by the container from penetrating the female part enough to cause the male and the female parts to engage in the locking position.

16. The package of claim 1, wherein:
the container has a thickness between the first and second surfaces relative to a length of the male part such that when the male part is placed on the first surface with the tip fully inserted into the aperture of the container, and the female part is placed on the second, opposite surface, the blocking means prevents the male part from penetrating the female part enough to cause the male and the female parts to engage in the locking position.

17. A package for at least one animal identification and/or animal tissue collecting device configured to store said at least one identification and/or collecting device, wherein said package comprises:
a male part of an identification and/or collecting device, which comprises a rod and a tip;
a female part of the identification and/or collecting device, which comprises a cavity configured to receive the tip of the male part such that when the tip is inserted fully into the cavity of the female part, the male part becomes irreversibly joined to the female part in a locking position;
at least one container formed by or inserted into a cavity of said package and containing a specific agent designed to be applied at least partially to at least one element of said identification and/or collecting device;
at least one holding cavity, which holds the male part of the identification and/or collecting device, the male part being removable from the at least one holding cavity; and
at least one support, which holds the female part of the identification and/or collecting device, the female part being removable from the at least one support;
wherein the container comprises:
an aperture configured to receive the tip of the male part when the male part is removed from the holding cavity and placed on a first side of the container; and
blocking means configured to prevent said male part from penetrating said female part enough to cause said male and said female parts to engage in the locking position during an introduction of the tip of the male part in said container when the female part is removed from the support and held against a second, opposite surface of the container, where the locking position irreversibly joins the male part and the female part, wherein said blocking means take the shape of at least a pin that is configured to abut a tissue collection tool or a tag application tool.

18. A package for at least one animal identification and/or animal tissue collecting device configured to store said at least one identification and/or collecting device, wherein said package comprises:
   a male part of an identification and/or collecting device, which comprises a rod and a tip;
   a female part of the identification and/or collecting device, which comprises a cavity configured to receive the tip of the male part such that when the tip is inserted fully into the cavity of the female part, the male part becomes irreversibly joined to the female part in a locking position;
   at least one container formed by or inserted into a cavity of said package and containing a specific agent to be applied at least partially to at least one element of said identification and/or collecting device;
   at least one holding cavity, which holds the male part of the identification and/or collecting device, the male part being removable from the at least one holding cavity; and
   at least one support, which holds the female part of the identification and/or collecting device, the female part being removable from the at least one support;
   wherein the container comprises:
      an aperture configured to receive the tip of the male part when the male part is removed from the holding cavity and placed on a first side of the container; and
      a dimension relative to a length of the rod of the male part that permits the tip of the male part to be introduced into the container and prevents the tip from being inserted fully into the female part to the locking position when the female part is positioned on an opposite surface of the container as the male part, which prevents irreversible joining of said male and female parts during introduction of the male part in said container.

19. A package for at least one animal identification and/or animal tissue collecting device configured to store said at least one identification and/or collecting device, wherein said package comprises:
   a male part of an identification and/or collecting device, which comprises a rod and a tip;
   a female part of the identification and/or collecting device, which comprises a cavity configured to receive the tip of the male part such that when the tip is inserted fully into the cavity of the female part, the male part becomes irreversibly joined to the female part in a locking position;
   at least one container formed by or inserted into a cavity of said package and containing a specific agent to be applied at least partially to at least one element of said identification and/or collecting device;
   at least one holding cavity, which holds the male part of the identification and/or collecting device, the male part being removable from the at least one holding cavity; and
   at least one support, which holds the female part of the identification and/or collecting device, the female part being removable from the at least one support;
   wherein the container comprises:
      an aperture configured to receive the tip of the male part when the male part is removed from the holding cavity and placed on a first side of the container; and
      a protrusion or a notch in said container configured to prevent said male part from penetrating said female part enough to cause said male and said female parts to engage in the locking position during an introduction of the tip of the male part in said container when the female part is removed from the support and held against a second, opposite surface of the container, where the locking position irreversibly joins the male part and the female part.

* * * * *